United States Patent [19]

Yesulis

[11] 4,078,876

[45] Mar. 14, 1978

[54] TARTLET PRESS

[76] Inventor: William Yesulis, 444 Beaumont Dr., Vista, Calif. 92083

[21] Appl. No.: 670,655

[22] Filed: Mar. 26, 1976

[51] Int. Cl.² ............................................ A21C 11/00
[52] U.S. Cl. .................................. 425/458; 425/412; 219/229; 219/243
[58] Field of Search .................. 99/426, 372, 432–433, 99/439, 428, 450.2, 450.6, 378, 451, 353; 219/221, 228–229, 236–240, 242–243, 533; 156/579, 583; 100/92, 93 P; 425/407, 412, 458, 410, 423, 358, 87; 228/51–55, 19, 20

[56] References Cited

U.S. PATENT DOCUMENTS

| | | | |
|---|---|---|---|
| 2,424,848 | 7/1947 | Reitan | 228/55 |
| 2,469,877 | 5/1949 | Haberman | 228/51 |
| 2,473,402 | 6/1949 | Wood | 99/378 |
| 2,751,484 | 6/1956 | Moon | 228/51 |
| 3,375,791 | 4/1968 | Pakula | 425/412 |
| 3,703,624 | 11/1972 | Simsack | 228/52 |
| 3,770,183 | 11/1973 | Vanyi | 228/51 |
| 3,902,693 | 9/1975 | Crandon | 425/410 |

OTHER PUBLICATIONS

I.B.M. Technical Disclosure Bulletin, vol. 1, No. 2, Aug. 1958.

*Primary Examiner*—Harvey C. Hornsby
*Assistant Examiner*—Robert Pous

[57] ABSTRACT

An electrically heated tartlet press for forming pastry shells upon application of pressure and heat to a body of pastry dough seated on the bottom of a tapered well in a tart pan, comprising an enlarged tapered cylindrical head fabricated from rigid heat conductive material and having a flat bottom wall of minor diameter adapted to extend into the well, an outwardly inclined side wall of major diameter at its upper end, and a tapered flange extending radially outwardly from the inclined wall and adaptable to bear against the pan well entry and center the head when pressed into the pastry dough; an insulated shaft upstanding centrally of the head; a core of heat transmitting material within the shaft in heat conducting relation with the head; an electrical heating element within the shaft and in heat conducting relation with the core; an electrically and heat insulated handle remote from the head at the other end of the shaft; and means for transmitting electric current to and for energizing the electric heating element.

10 Claims, 7 Drawing Figures

U.S. Patent           March 14, 1978           4,078,876
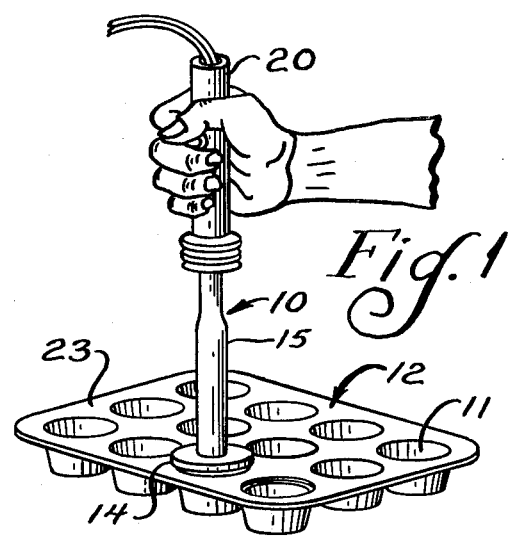
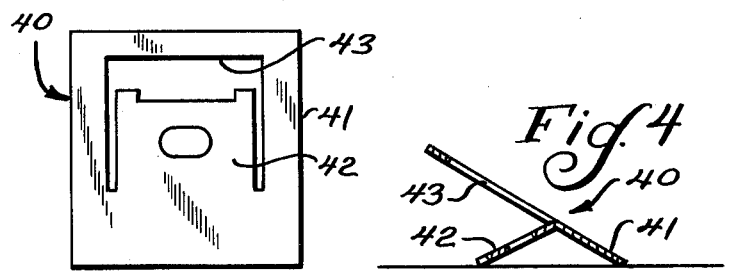
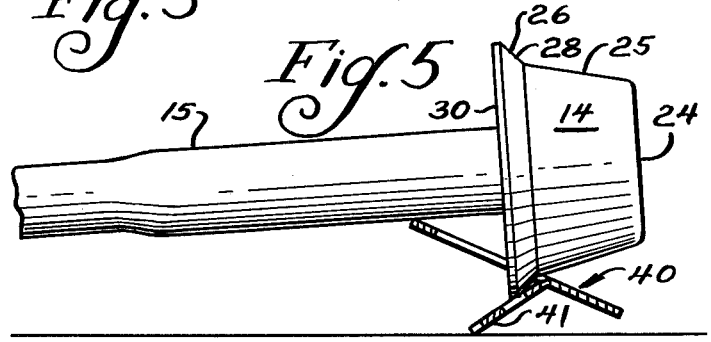
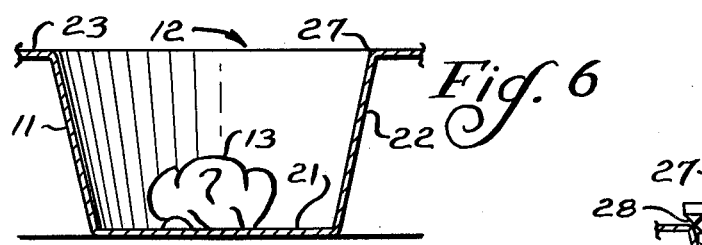
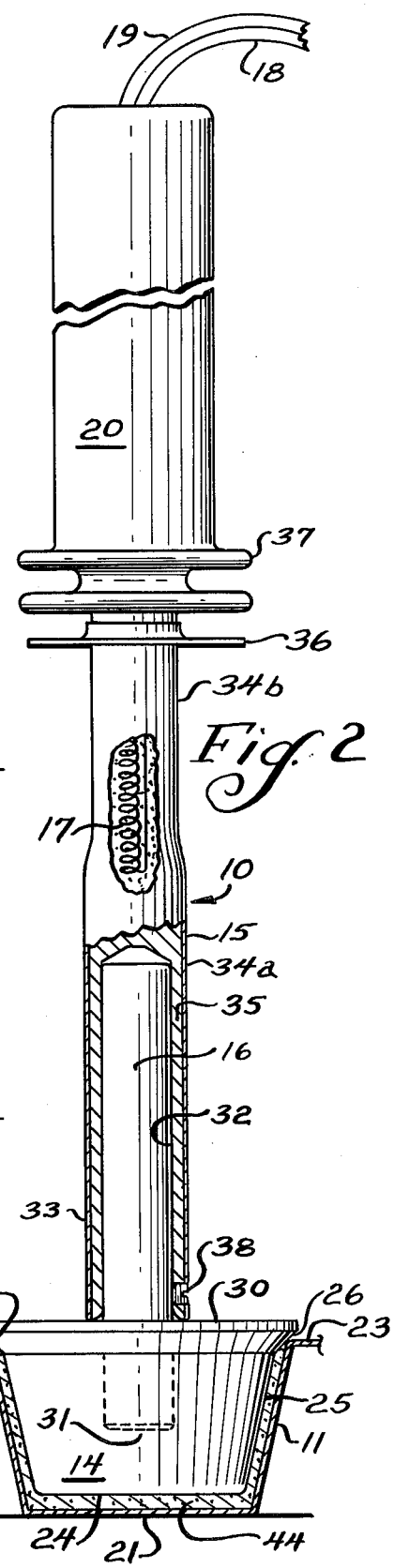

TARTLET PRESS

BACKGROUND AND SUMMARY OF THE INVENTION

This invention relates to an electrically heated tartlet press, and is more particularly concerned with a press for forming pastry shells upon application of heat and pressure to a body of pastry dough seated on the bottom of a tapered well in a tart pan.

A tartlet press of the character referred to comprises an enlarged tapered cylindrical head, adapted to seat in a tapered well of a tart pan, the head being fabricated from rigid heat conductive material and having a flat bottom wall of minor diameter, a tapered side wall, and a tapered flange on the major diameter of the head adaptable to bear against the well entry and center the head when the head is inserted into the pan well, and upstanding centrally of the head is an insulated shaft. Within the shaft is a core of heat transmitting material in heat conducting relation with the head and an electric heating element in heat conducting relation with the core, and at the other end of the shaft remote from the head is an electrically and heat insulated handle and means for transmitting electric current to and for energizing the electric heating element.

Conventionally, bakers by hand manipulate the pastry dough against the bottom and side wall of the tart pan to form a pastry shell. Care must be taken to evenly and adequately spread the dough to cover the entire shell cavity, and that effort is time consuming because of the manual movement required and the pastry nature of the dough material. Shell forming molds have been tried for working the dough, but often require coating with a dough releasant, extensive set-up time, lack centering means, or have critical tolerances and are usually very expensive and custom made. As compared to conventional manual pastry shell forming procedures, it has been found that two bakers are required to make 50 doz. tartlet shells in 2 hours, but with the novel tartlet press disclosed in this application, a single baker can form 50 doz. tartlet shells in 1 hour.

OBJECTS OF THE INVENTION

It is the object of the present invention to provide a novel electrically heated tartlet press of the character referred to.

Another object is to provide a rigid tapered cylindrical heat conductive head for an electrically heated tart press.

Another object is to provide a novel electrically heated tart press having a peripheral outwardly circumferentially disposed tapered flange on its head which is adapted to center and stop movement of the head into a body of pastry dough seated in a conventional tart pan well for spreading the dough over the wall and bottom of the well.

Another object is to provide a novel tartlet press having an upstanding insulated shaft containing electrically heating means in heat conducting relation with a tart shell forming head on one end thereof and a handle on the other end.

Another object is to provide a tartlet press of the character referred to which is inexpensive and easy to manufacture and which is simple and efficient in use.

These and other advantages will become apparent as this description proceeds, taken in conjunction with the accompanying drawings.

BRIEF DESCRIPTION OF THE DRAWINGS

In the drawings:

FIG. 1 is a perspective view showing a tartlet press embodying the present invention in use.

FIG. 2 is a side elevational view of the tartlet press, partially in section, in a tartlet pan well.

FIG. 3 is a plan view of a holding bracket for the tartlet press.

FIG. 4 is a sectional view of the holding bracket, bent in position to receive the tartlet press.

FIG. 5 is a side elevational view of the head and shaft of the press mounted on the holding bracket.

FIG. 6 is a sectional view of a tartlet pan well, a body of pastry dough shown deposited therein.

FIG. 7 is a schematic view of a typical wiring circuit for the tartlet press.

DESCRIPTION OF A PREFERRED EMBODIMENT

A tartlet press embodying the present invention may be used to form tart shells from pie or short dough, in the manner shown in FIG. 1, by inserting the press 10 under heat and pressure into a well 11 of a cup cake or similar pan 12, into which has been placed a body of dough 13.

The press 10 has an enlarged head 14 fabricated from rigid heat conductive material, an insulated shaft 15 upstanding centrally of the heat, a core 16 of heat transmitting material within the shaft and in heat conducting relation with the head, an electrical heating element 17 within the shaft and in heat conducting relation with the core, and lead wires 18 and 19 connecting the heating element to a source of power, there being provided at the end of the shaft 15 remote from the head 14 an insulated handle 20 for manually grasping the press during tart shell formation.

Conventional cake pans 12 typically have tapered wells 11, with a bottom wall 21 of minor diameter, an outwardly inclined side wall 22, and an upper wall 23. Likewise, the head 14 of the tartlet press 10 has a bottom wall 24 of minor diameter and an outwardly inclined side wall 25, the relative sizes of those elements in relation to the size of the bottom and side walls of the pan well being such as to leave a space between the well and the head for accommodating the tart shell to be formed. At the upper end of the side wall 25 is a tapered peripheral flange 26 adapted to bear against the edge 27 of the pan between its side wall 22 and upper wall 23, the lower surface 28 of the flange being inclined toward the well as to center the head when it is thrust into the well.

The head is apertured centrally of its top wall 30, and receives therein to about its midpoint 31 the core 16 projecting above the head 14 into a central aperture 32 formed in the shaft 15. The shaft is composed of a swaged tube 33 having major and minor diameters, 34a and b respectively, which is filled with electrical insulation material 35; and embedded within the insulation is an electrical heating element 17, composed of a winding of electrical resistance wire. The heating element 17 is in heat transfer relation to the core 16 which is in heat transfer relation with the head 14. On the tube 33 above the heating element 17 is a heat shield 36, and an electrically and heat insulated handle 20, having fins 37, centrally apertured to permit connection of lead wires 18 and 19 for electrically connecting the heating element 17 to a source of power. Preferably, the core 16 is press fit into the head 14 and is locked into the shaft 15 by means of set screw 38, so that the head may be removed for cleaning or other heads for replacement or of different sizes to form other similar kinds of pastry shells may be provided with a similar core connection and substituted for the head as shown.

Preferably, the heating element 17 comprises a spool wound heating element, of about 120 watts, 110 volts, operable to provide a temperature of about 850° F., and has resistance wire 39 bridging the leads 18 and 19.

To hold the heated head 14 between uses there is provided a bracket 40 having a frame 41 and a depending leg 42, the frame having a central cut-out 43 for holding the head elevated over a table or other surface.

In use, the press 10 is heated and hand held by its handle 37, and its head 14 is plunged into the pan well 11, whereupon the fat in the body of dough 13 is heated as to make the dough workable upon application of pressure to spread over the bottom and side walls of the well, 21 and 22, respectively, thereby forming the tart shell 44. The heating of the shell 44 also permits release of the head from the formed tart upon withdrawal of the head from the well. After the tart shell has been formed, it may be filled and baked in a conventional manner.

While I have shown and described in considerable detail a preferred embodiment of a tartlet press embodying the invention, many changes and modifications may be made in the structure without departing from the spirit or scope of the invention, and it is not intended that the invention be limited to the exact construction shown and described.

I claim:

1. An electrically heated tartlet press for forming a pastry shell upon application of heat and pressure to a body of pastry dough seated in the well of a baking pan, said tartlet press comprising an enlarged head of heat conducting rigid material adapted to freely enter said well for heating the dough body and forming it into a tartlet shell, an insulated shaft extending from said head, an electrical heating element within said shaft, a core of heat conductive material for transmitting heat from the heating element to said head, an insulated handle on the shaft remote from said head for manipulating said head into said well and for applying pressure on the dough body, and means for connecting electric current to said heating element, said head having a flat bottom wall of minor periphery, a side wall tapering outwardly radially from said bottom wall, an upper wall of major periphery at the upper end of said head, and an intermediate wall tapering outwardly radially in a direction inclined from said side wall toward said upper wall for centering said head in said well when inserted therein.

2. In the tartlet press recited in claim 1, wherein said head and said shaft are each apertured to receive opposed ends of said core therein.

3. In the tartlet press recited in claim 2, wherein said core extends into said head more than half the distance between said upper and bottom walls for even distribution of heat from the interior of said head to the periphery thereof.

4. In the tartlet press recited in claim 2, wherein the core is press-fitted into the head and separable means secures the core to the shaft.

5. In the tartlet press recited in claim 3, wherein the core is press-fitted into the head and separable means secures the core to the shaft.

6. In the tartlet press recited in claim 5, wherein said shaft comprises a tube and electrical and heat insulating means for insulating said heating element and core from the exterior of said tube.

7. In the tartlet press recited in claim 6, wherein said tube is swaged and of reduced cross section in the area of the heating element to firmly secure said heating element and insulating means therein.

8. In the tartlet press recited in claim 1, wherein said shaft comprises a tube and electrical and heat insulating means for insolating said heating element and core from the exterior of said tube.

9. In the tartlet press recited in claim 8, wherein said tube is swaged and of reduced cross-section in the area of the heating element to firmly secure said heating element and insulating means therein.

10. In the tartlet press recited in claim 1, wherein said press has a bracket for holding said head elevated above a surface, said bracket comprising a frame and leg depending from said frame, said frame and leg adapted to rest on said surface, and an aperture in said frame remote from said leg for holding said head therein.

* * * * *